(12) United States Patent
Jeong et al.

(10) Patent No.: US 9,462,609 B2
(45) Date of Patent: Oct. 4, 2016

(54) METHOD FOR CONNECTING WIRELESS CHANNEL AND APPARATUS FOR PERFORMING THE METHOD

(71) Applicants: Yang Seok Jeong, Seoul (KR); Joo Young Kim, Seoul (KR)

(72) Inventors: Yang Seok Jeong, Seoul (KR); Joo Young Kim, Seoul (KR)

(73) Assignee: KT Corporation, Seongnam-si (KR)

( * ) Notice: Subject to any disclaimer, the term of this patent is extended or adjusted under 35 U.S.C. 154(b) by 176 days.

(21) Appl. No.: 13/912,924

(22) Filed: Jun. 7, 2013

(65) Prior Publication Data

US 2014/0016547 A1    Jan. 16, 2014

(30) Foreign Application Priority Data

Jun. 7, 2012 (KR) .................. 10-2012-0061045
Sep. 18, 2012 (KR) .................. 10-2012-0103397

(51) Int. Cl.
*H04W 74/08* (2009.01)
*H04W 84/12* (2009.01)

(52) U.S. Cl.
CPC ......... *H04W 74/08* (2013.01); *H04W 74/0833* (2013.01); *H04W 84/12* (2013.01); *Y02B 60/50* (2013.01)

(58) Field of Classification Search
None
See application file for complete search history.

(56) References Cited

U.S. PATENT DOCUMENTS

| 2002/0110085 A1 | 8/2002 | Ho et al. | |
| 2005/0058151 A1* | 3/2005 | Yeh ................. | 370/445 |
| 2006/0187840 A1* | 8/2006 | Cuffaro et al. ............... | 370/235 |
| 2008/0205433 A1* | 8/2008 | Pihlaja et al. ................ | 370/461 |
| 2010/0226342 A1* | 9/2010 | Colling et al. ................ | 370/336 |
| 2011/0255401 A1* | 10/2011 | Seok ..................... | H04W 48/20 370/230 |

FOREIGN PATENT DOCUMENTS

| KR | 10-2006-0078209 A | 7/2006 |
| KR | 10-2012-0025392 A | 3/2012 |

OTHER PUBLICATIONS

Xia et al, "Contention Window Adjustment for IEEE 802.11 WLANs: A Control-Theoretic Approach", IEEE International Conference on Communications, Jun. 2006.*

* cited by examiner

*Primary Examiner* — Awet Haile
*Assistant Examiner* — Kent Krueger
(74) *Attorney, Agent, or Firm* — Sughrue Mion, PLLC

(57) ABSTRACT

The method performed in the terminal includes generating a random value for wireless channel access, receiving a competitive index indicating a channel competition state from an access point, and determining whether to attempt a wireless channel access based on a comparison result between the random value and the competitive index.

Accordingly, in an environment in which a large number of wireless local area network (WLAN) terminals simultaneously attempt the wireless channel access, each terminal voluntarily restricts a wireless connection request in accordance with wireless channel environment information transmitted by an access point, that is, competitive indexes, and therefore wireless channel access competition may be alleviated, thereby improving a wireless connection speed of the terminal and reducing power consumption of the terminal.

21 Claims, 7 Drawing Sheets

| ELEMENT ID | LENGTH(5) | STATION COUNT | CHANNEL UTILIZATION | AVAILABLE ADMISSION CAPACITY |
|---|---|---|---|---|
| 1 | 1 | 2 | 1 | 2 |

OCTETS:

METHOD FOR CONNECTING WIRELESS CHANNEL AND APPARATUS FOR PERFORMING THE METHOD

CLAIM FOR PRIORITY

This application claims priority to Korean Patent Application No. 2012-0061045 filed on Jun. 7, 2012, No. 2012-0103397 filed on Sep. 18, 2012 and No. 2013-0063604 filed on Jun. 3, 2013 in the Korean Intellectual Property Office (KIPO), the entire contents of which are hereby incorporated by reference.

BACKGROUND

1. Technical Field

Example embodiments of the present invention relate in general to wireless communication technologies and more specifically to a wireless channel access method which may improve a connection speed via wireless channel and reduce power consumption and an apparatus for performing the method.

2. Related Art

With the development of information communication technologies, a variety of wireless communication technologies have been developed. Among these technologies, wireless local area network (WLAN) technology makes wireless connection to the Internet possible at homes or businesses or in specific service providing areas using a portable terminal such as a personal digital assistant (PDA), a laptop computer, a portable multimedia player (PMP), or the like, based on wireless communication technologies.

The standard of the Institute of Electrical and Electronics Engineers (IEEE) 802.11 standard has been developed as a standard for WLAN technology.

IEEE 802.11a provides a transmission speed of 54 Mbps using an unlicensed band at 5 GHz. IEEE 802.11b provides a transmission speed of 11 Mbps by applying a direct sequence spread spectrum (DSSS) method at 2.4 GHz. IEEE 802.11g provides a transmission speed of 54 Mbps by applying orthogonal frequency division multiplexing (OFDM) at 2.4 GHz. IEEE 802.11n provides a transmission speed of 300 Mbps when using two spatial streams and a bandwidth of 40 MHz, and provides a transmission speed of 600 Mbps when using four spatial streams and a bandwidth of 40 MHz.

As such WLAN technology becomes more prevalent and its applications become more diverse, there is increasing demand for new WLAN technology that can support a higher processing throughput than a data processing speed supported by IEEE 802.11n.

Very high throughput (VHT) WLAN technology is one among IEEE 802.11 WLAN technologies proposed to support a data processing speed of 1 Gbps or higher. Among these, IEEE 802.11ac has been developed as a standard for providing VHT in a band at 5 GHz, and IEEE 802.11ad has been developed as a standard for providing VHT in a band at 60 GHz.

Meanwhile, a system based on such WLAN technology may adopt carrier sense multiple access/collision avoidance (CSMA/CA) as a wireless channel access method.

In order for a WLAN terminal to connect to an access point, the WLAN terminal first determines whether a wireless channel is already occupied by another terminal, waits for a predetermined time period when the wireless terminal is determined to be in an idle state, and then transmits an authentication frame to the access point, thereby starting to perform a connection process.

In such a connection process, when a small number of terminals carry out channel access in order to simultaneously connect to the access point, data may be transmitted to the access point within a time range of a small contention window (CW).

However, when thousands of terminals simultaneously attempt to connect to the access point such as in a smart grid or a sensor network, a probability of a plurality of terminals simultaneously transmitting data is dramatically increased.

Accordingly, there is a problem that a corresponding terminal has to wait for completion of data transmission of a large number of other terminals having a shorter back-off timer than a back-off timer of the corresponding terminal before starting first data transmission.

In addition, when transmitting data after expiration of the back-off timer, the terminal has a significantly high possibility of occurrence of collision with data transmitted by other neighboring terminals which are in a hidden-node relationship, and therefore the CW has to be increased and the data has to be retransmitted.

Furthermore, since an opposite-side terminal in which data collision occurs as well as the terminal itself should also carry out data retransmission, the number of data retransmissions of terminals within a basic service set (BSS) is also rapidly increased, thereby causing intense wireless channel access competition.

SUMMARY

Accordingly, example embodiments of the present invention are provided to substantially obviate one or more problems due to limitations and disadvantages of the related art.

Example embodiments of the present invention provide a wireless channel access method which may improve a connection speed of a terminal and reduce power consumption by alleviating a wireless channel access competition.

Example embodiments of the present invention also provide a wireless channel access apparatus which may perform the wireless channel access method.

In some example embodiments, a wireless channel access method which is performed in a terminal includes: generating a random value for a wireless channel access; receiving a competitive index indicating a channel competition state from an access point; and determining whether to attempt the wireless channel access based on a comparison result between the random value and the competitive index.

Here, the competitive index may be a channel utilization value of a basic service set (BSS) load element.

Also, the competitive index may be a value determined based on at least one of collision rate information, authentication request frequency information, and association request frequency information.

Also, the determining of whether to attempt the wireless channel access may include transmitting a wireless connection request message to the access point when the random value exceeds the competitive index.

Also, the determining of whether to attempt the wireless channel access may include waiting for a preset time period when the random value is smaller than or equal to the competitive index.

Also, after the waiting for the preset time period, the method may further include: generating a first random value larger than the random value; receiving another competitive index different from the competitive index from the access point; and determining whether to attempt the wireless channel access based on a comparison result between the first random value and the other competitive index.

Also, the generating of the first random value may include generating the first random value larger than the random value based on a maximum competitive index and the number of determinations of whether to attempt the wireless channel access.

Also, the generating of the first random value may include generating the first random value larger than the random value by applying a preset scaling value to the random value.

Also, after the waiting for the preset time period, the method may further include: receiving another competitive index different from the competitive index from the access point; generating a first competitive index smaller than the competitive index by applying a preset scaling value to the other competitive index; and determining whether to attempt the wireless channel access based on a comparison result between the random value and the first competitive index.

Also, the method may further include setting a first time period shorter than the preset time period by applying a scaling value to the preset time period; and performing the generating of the random value, the receiving of the competitive index, and the determining of whether to attempt the wireless channel access again.

In other example embodiments, a wireless channel access method which is performed in an access point includes: determining a competitive index indicating a channel competition state at every preset period; determining whether connection restriction of a plurality of terminals is required; and transmitting the determined competitive index to the plurality of terminals when it is determined that the connection restriction is required.

Here, the competitive index may be a channel utilization value of a BSS load element.

Also, the competitive index may be a value determined based on at least one of collision rate information, authentication request frequency information, and association request frequency information.

In still other example embodiments, a terminal includes: a communication unit; a random value generating unit configured to generate and provide a random value for wireless channel access; and a processing unit configured to compare the random value and a competitive index indicating a channel competition state received through the communication unit, and determine whether to attempt a wireless channel access based on the comparison result.

Here, when the random value exceeds the competitive index, the processing unit may transmit a wireless connection request message to the access point through the communication unit.

Also, when the random value is smaller than or equal to the competitive index, the processing unit may wait for a preset time period, and control the random value generating unit so as to generate a first random value larger than the random value.

Also, based on the control of the processing unit, the random value generating unit may generate a first random value larger than the random value based on a maximum competitive index and the number of determinations of whether to attempt the wireless channel access, and provide the generated first random value to the processing unit.

Also, the processing unit may receive another competitive index different from the competitive index from the access point through the communication unit, compare the first random value and the other competitive index, and then determine whether to attempt the wireless channel access again based on the comparison result.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
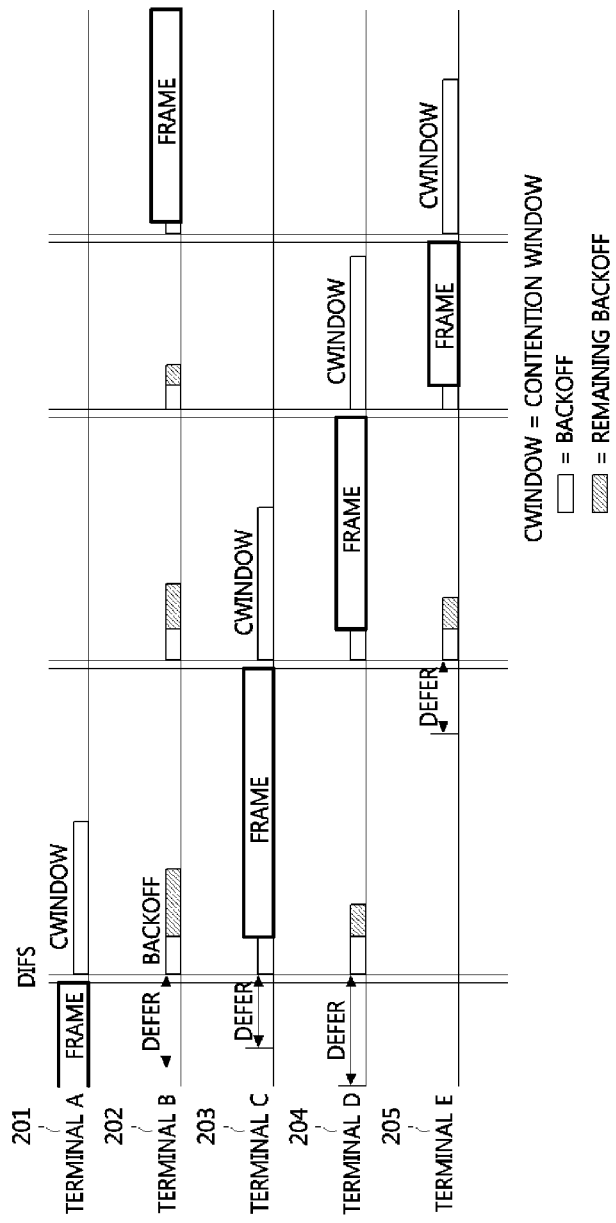
FIG. 1 is a conceptual diagram illustrating a process of transmitting data to an access point by a plurality of terminals by attempting to access to a wireless channel.

Example embodiments of the present invention are disclosed herein. However, specific structural and functional details disclosed herein are merely representative for purposes of describing example embodiments of the present invention, and thus example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present invention will be described in detail with reference to the accompanying drawings. In the drawings and description, elements that appear in more than one drawing and/or elements that are mentioned in more than one place in the description are always denoted by the same respective reference numerals and are not described in detail more than once.

In the entire specification, a station (STA) is an arbitrary functional medium including a medium access control (MAC) layer defined by the Institute of Electrical and Electronics Engineers (IEEE) 802.11 standard, and a physical layer interface with respect to a wireless medium. STAs may be divided into STAs that are access points (APs) and STAs that are non-APs. An STA that is an AP may be simply referred to as an AP, and an STA that is a non-AP may be simply referred to as a terminal.

The terminal may include a processor and a transceiver, and may further include a user interface, a display device, and the like. The processor denotes a unit that is designed to generate a frame to be transmitted through a wireless network or process a frame received through the wireless network, and performs a variety of functions for controlling the station (STA).

The transceiver may be functionally connected to the processor, and is a unit that is designed to transmit and receive a frame through the wireless network for the STA.

The AP may refer to a centralized controller, a base station (BS), a Node-B, an eNode-B, a base transceiver system, a site controller, or the like, and may include some or all functions thereof.

The terminal may refer to user equipment (UE), a mobile station (MS), a user terminal (UT), a wireless terminal, an access terminal (AT), a terminal, a subscriber unit, a subscriber station (SS), a wireless device, a wireless communication device, a wireless transmission/reception unit (WTRU), a mobile node, a mobile, or other terms.

Various embodiments of the terminal may include a cellular phone, a smart phone having a wireless communication function, a personal digital assistant (PDA) having a wireless communication function, a wireless modem, a portable computer having a wireless communication function, a photographing device such as a digital camera having a wireless communication function, a gaming device having a wireless communication function, music storage and reproduction appliances having a wireless communication function, Internet appliances enabling wireless Internet connection and browsing, and a portable unit or terminals with integrated combinations of such functions, but are not limited thereto.

Figure 2:
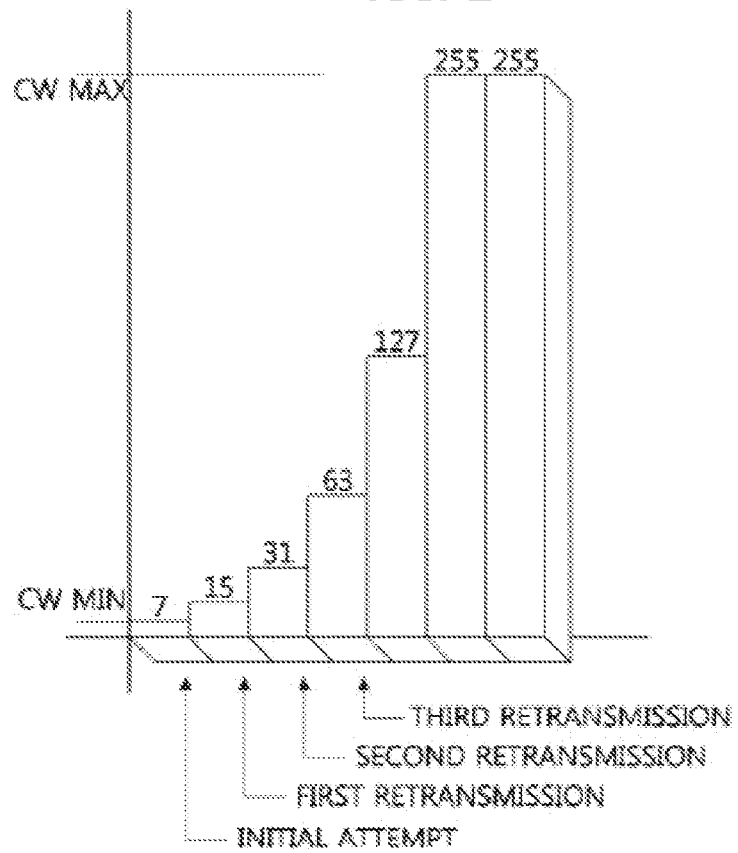
FIG. 2 is a conceptual diagram illustrating a value of a contention window (CW) which is increased exponentially in accordance with data retransmission.

FIG. 1 is a conceptual diagram illustrating a process of transmitting data while a plurality of terminals are contending a wireless channel access, and FIG. 2 is a conceptual diagram illustrating a value of a contention window (CW) which is increased exponentially in accordance with data retransmission.

For clear understanding of embodiments of the present invention, a CSMA/CA mechanism will be described with reference to FIGS. 1 and 2.

In the Institute of Electrical and Electronics Engineers (IEEE) 802.11 standards, a basic access mechanism of medium access control (MAC) is a CSMA/CA mechanism. The CSMA/CA mechanism may be referred to as a distributed coordination function (DCF) of MAC, and basically adopts a "listen before talk" access mechanism. In such an access mechanism, a terminal listens to a wireless channel or a medium prior to starting transmission of the terminal's own data.

When a wireless channel is detected to be used based on the listening result, a terminal waits until the channel become idle. Once the wireless channel is detected to be in an idle state in which the wireless channel is not used, the terminal enters backoff procedure to wait for a time period corresponding to inter frame space (IFS) and a contention window (CW). At the end of this backoff procedure a terminal can transmit an authentication frame to an access point, and therefore starts to perform a wireless connection process.

Here, IFS refers to a time during which a terminal has to stand by for data transmission so as to reduce a probability of occurrence of collision because the terminal does not know whether another terminal far away from the terminal has already started data transmission even though the channel is detected to be in an idle state.

When using distributed coordination function (DCF) as a channel access method, distributed IFS (DIFS) may be used as IFS.

In addition, CW is a parameter of a time range in the unit of a time-slot. The terminal randomizes a transmission start point of time within a certain section so as to prevent transmission collision with other terminals without starting data transmission immediately after IFS.

For this, the terminal selects an arbitrary number (unit of a time-slot) within a range of CW and uses the selected number as its transmission back-off timer.

Referring to FIG. 1, at a point of time when a terminal A (201) completes data transmission, a terminal B (202), a terminal C (203), and a terminal D (204) start to perform a back-off operation for channel access. Here, since the terminal C (203) has the shortest back-off timer, the back-off timer of the terminal C (203) expires first and then the terminal C (203) transmits data first.

In this instance, the terminal B (202) and the terminal D (204) temporarily stop their own back-off timers to enter a standby state immediately after the terminal C (203) starts data transmission.

Next, when the terminal C (203) completes the data transmission, the back-off timer is resumed again, and the terminal D (204) transmits data because the back-off timer of the terminal D (204) expires first.

Meanwhile, even when transmitting data after listening to the channel as described above, collision between data may occur due to a hidden node problem or the like. In this manner, when collision between data occurs, each terminal sets the back-off timer again by increasing the CW, and starts data retransmission.

Referring to FIG. 2, the CW is selected within a range of [$CW_{min}$, $CW_{max}$], and $CW_{max}$ is exponentially increased for each data retransmission.

In such an environment, when a smaller number of terminals simultaneously carry out a channel access so as to attempt to connect to an access point, a small number of attempts and successes of data retransmission are realized within a small CW time range.

However, when thousands of terminals simultaneously carry out a wireless channel access so as to attempt to connect to an access point such as in a smart grid or a sensor network, a probability of a plurality of terminals simultaneously transmitting data is dramatically increased, and therefore a corresponding terminal has to wait for completion of data transmission of a large number of other terminals having a shorter back-off timer than a back-off timer of the corresponding terminal before starting first data transmission.

Furthermore, data has to be retransmitted by increasing the CW due to a further increase in the probability of occurrence of data collision, and therefore competition for a wireless channel access is even worse.

Therefore, according to an embodiment of the present invention, a wireless channel access method for alleviating the wireless channel access competition will be described with reference to the drawings.

Figure 3:
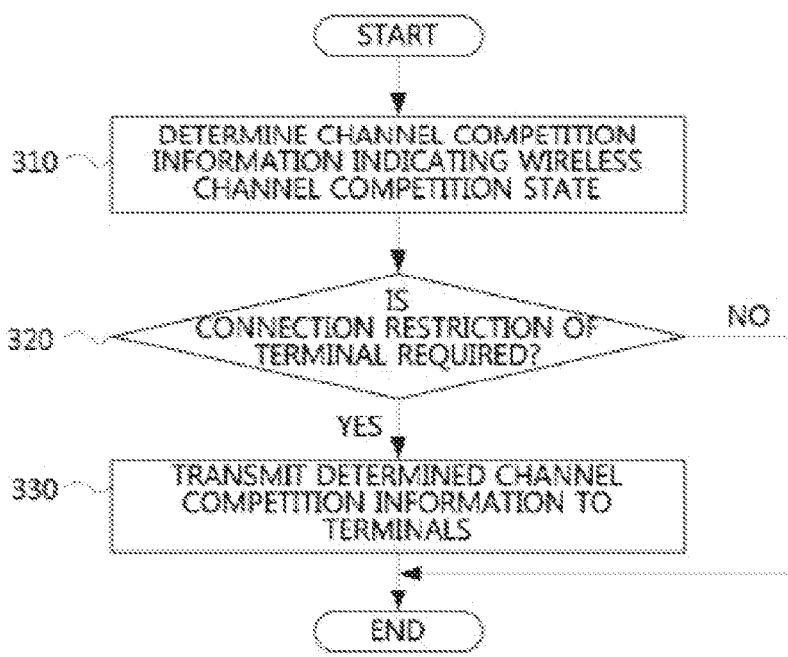
FIG. 3 is a flowchart illustrating a wireless channel access control process which is performed in an access point according to an embodiment of the present invention.
Figures 4, 5:
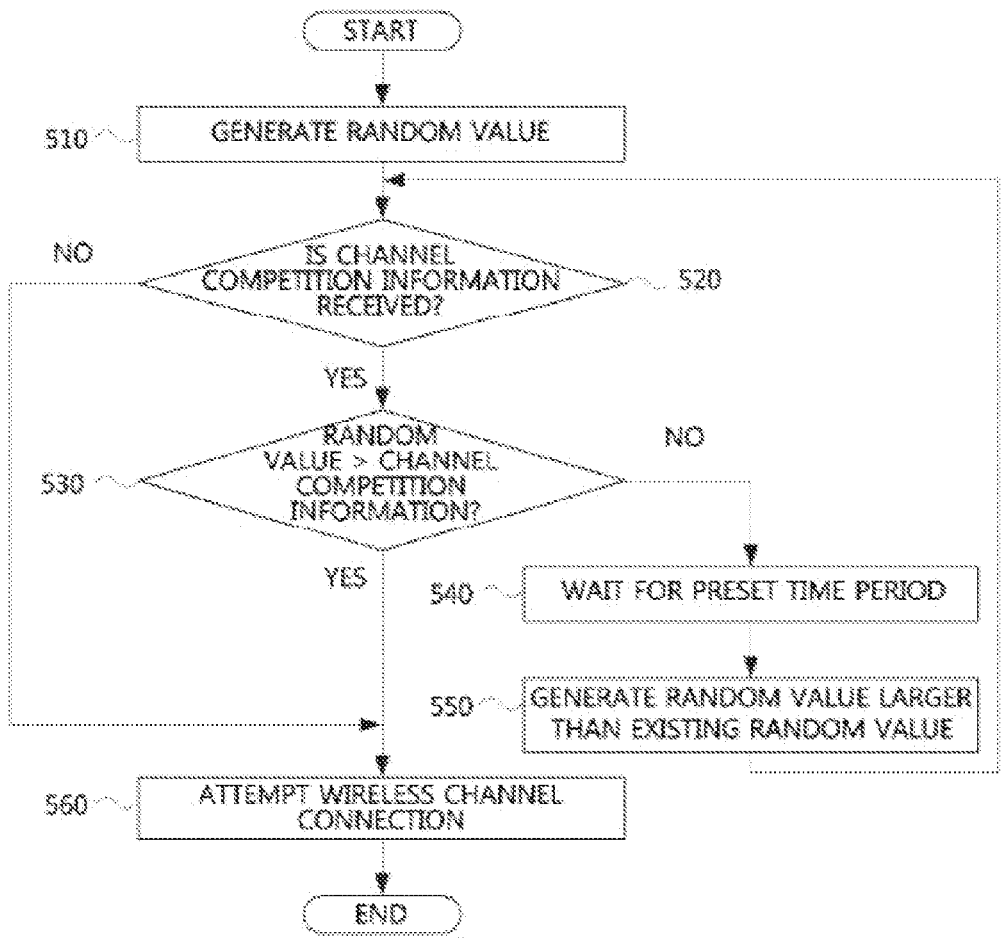
FIG. 4 is a conceptual diagram illustrating a basic service set (BSS) load element format capable of including a competitive index according to an embodiment of the present invention.
FIG. 5 is a flowchart illustrating a wireless channel access process which is performed in a terminal according to an embodiment of the present invention.

FIG. 3 is a flowchart illustrating a wireless channel access control process which is performed in an access point according to an embodiment of the present invention, and FIG. 4 is a conceptual diagram illustrating a basic service set (BSS) load element format capable of including a competitive index according to an embodiment of the present invention.

Hereinafter, in a state before a plurality of terminals 201-205, as in any of the figures, are connected to an access point 100, as in any of the figures, it is assumed that the access point 100 does not allocate connection periods of the plurality of terminals 201-205.

Referring to FIGS. 3 and 4, in operation 310, the access point 100 according to an embodiment of the present invention periodically determines a competitive index Q indicating a wireless channel competition state.

Specifically, the access point 100 may use values of channel utilization (1 byte: 0 to 255 steps) of a BSS load element as the competitive index Q as shown in FIG. 4.

Alternatively, the access point 100 may determine and update values of the competitive index Q within a range of [minimum competitive index ($Q_{min}$), maximum competitive index ($Q_{max}$)] based on information that can be collected by the access point 100 such as collision rate information, authentication request frequency information, association request frequency information, and the like.

Here, the minimum competitive index ($Q_{min}$) and the maximum competitive index ($Q_{max}$) respectively denote a minimum value and a maximum value of the values of the competitive index, and may indicate that channel access competition becomes intense along with an increase in the values of the competitive index in the same manner as in the channel utilization.

In operation 320, the access point 100 determines whether channel access of a terminal is required to be restricted based on the wireless channel competition state.

In operation 330, when it is determined through operation 320 that the channel access is required to be restricted, the access point 100 transmits the measured competitive index Q to a plurality of neighboring terminals.

FIG. 5 is a flowchart illustrating a wireless channel access process which is performed in a terminal according to an embodiment of the present invention.

Referring to FIG. 5, in operation 510, a terminal 200 generates a random value (r) within a range of [minimum random value ($r_{min}$), maximum random value ($r_{max}$)] so as to attempt to connect to the access point 100 before participating in wireless channel access competition.

Here, the minimum random value ($r_{min}$) and the maximum random value ($r_{max}$) respectively denote a minimum value and a maximum value which limit a range for generating the random value (r) by the terminal 200, and may be arbitrary values within the range [minimum competitive index ($Q_{min}$), maximum competitive index ($Q_{max}$)] of the competitive index.

Next, in operation 520, the terminal 200 determines whether the competitive index Q is received from the access point 100.

Here, the competitive index may be values of channel utilization (1 byte: 0 to 255 steps) of a BSS load element, and values determined based on collision rate information, authentication request frequency information, association request frequency information, and the like.

In addition, the minimum competitive index ($Q_{min}$) and the maximum competitive index ($Q_{max}$) respectively denote a minimum value and a maximum value of the values of the competitive index, and may indicate that channel access competition becomes intense along with an increase in the values of the competitive index in the same manner as in the channel utilization.

In operation 560, when it is determined through operation 520 that the a competitive index (channel competition information) is not received from the access point 100 for a preset time period, the terminal 200 attempts a wireless channel access.

Alternatively, in operation 530, when it is determined through operation 520 that the competitive index is received from the access point 100, the terminal 200 compares the generated random value (r) and the received competitive index.

In operation 540, when it is determined through operation 530 that the random value is smaller than or equal to the competitive index, the terminal 200 waits for a preset time period.

Here, the preset time period may be an arbitrary time period selected by the terminal 200 within a channel access restriction time range [0, T], and can be used to distribute a point of time of determining a secondary wireless channel access possibility of terminals with a primary wireless channel access restriction.

Next, in operation 550, the terminal 200 generates another random value larger than the random value.

Here, the terminal 200 may generate the other random value larger than the random value through the following Equation 1.

$$r(n) = \text{Min}(Q_{max}, 2^{n+1}-1) \qquad \text{[Equation 1]}$$

In Equation 1, n denotes n-th attempt for wireless channel access, r denotes a random value, and $Q_{max}$ denotes a maximum competitive index.

That is, a larger random value than the previous random value is generated along with an increase in the number of attempts for the wireless channel access, thereby increasing the possibility of the wireless channel access.

In addition, when repeatedly determining the wireless channel accessibility, the terminal 200 may generate the larger random value than the previous random value by applying a preset scaling value to the previous random value, thereby gradually increasing a possibility of the wireless channel access attempt.

Next, the terminal 200 returns to operation 520 to perform the following operations again.

Alternatively, in operation 560, when it is determined through operation 530 that the random value exceeds the received competitive index, the terminal 200 attempts a wireless channel access.

For example, when the random value exceeds the received competitive index, the terminal 200 may transmit an authentication request message to the access point 100.

In the wireless channel access method according to an embodiment of the present invention, in an environment in which a large number of wireless local area network (WLAN) terminals simultaneously attempt the wireless channel access, each terminal voluntarily restricts a wireless channel access in accordance with wireless channel environment information transmitted by an access point, that is, competitive indexes, and therefore wireless channel access competition may be alleviated, thereby improving a wireless connection speed of the terminal and reducing power consumption of the terminal.

In addition, the random value is gradually increased while repeatedly determining a wireless channel accessibility, thereby increasing a possibility of wireless channel access of the terminal.

Figure 6:
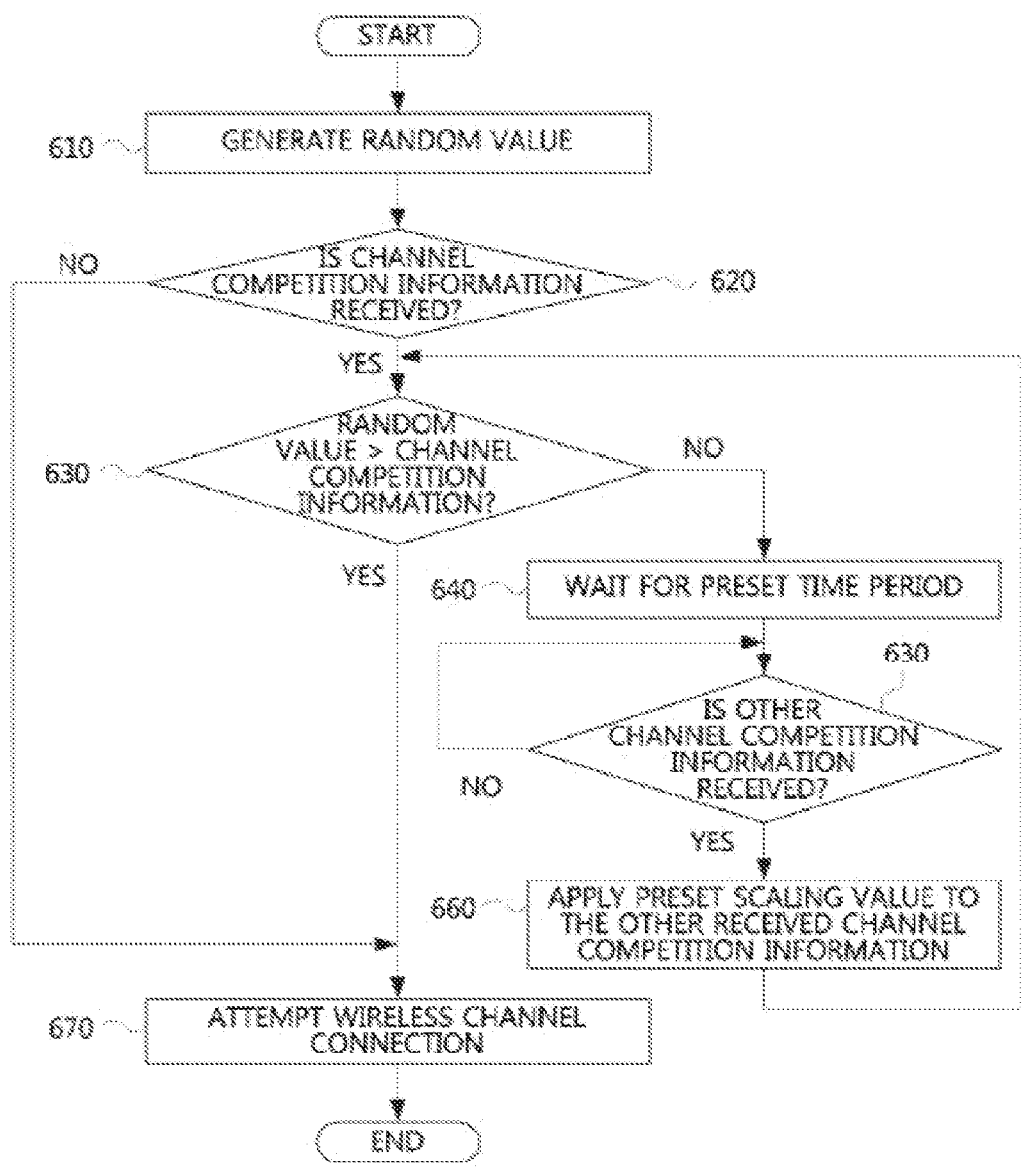
FIG. 6 is a flowchart illustrating a wireless channel access process which is performed in a terminal according to another embodiment of the present invention.

FIG. 6 is a flowchart illustrating a wireless channel access process which is performed in the terminal 200 according to another embodiment of the present invention.

Referring to FIG. 6, in operation 610, the terminal 200 generates a random value (r) within a range of [$r_{min}$, $r_{max}$] so as to attempt to connect to the access point 100 before participating in wireless channel access competition.

Next, in operation 620, the terminal 200 determines whether a competitive index Q is received from the access point 100.

In operation 670, when it is determined through operation 620 that the competitive index is not received from the access point 100 for a preset time period, the terminal 200 attempts a wireless channel access.

Alternatively, in operation 630, when it is determined through operation 620 that the competitive index is received from the access point 100, the terminal 200 compares the generated random value (r) and the received competitive index.

In operation 640, when it is determined through operation 630 that the random value is smaller than or equal to the competitive index, the terminal 200 waits for a preset time period.

Next, in operation 650, the terminal 200 determines whether another competitive index is received from the access point 100.

In operation 660, when it is determined through operation 650 that the other competitive index is received from the access point 100, the terminal 200 generates a smaller competitive index than a previous competitive index by applying a preset scaling value to the other received competitive index.

Next, the terminal 200 returns to operation 630 to perform the following operations again.

Alternatively, in operation 670, when it is determined through operation 630 that the random value exceeds the competitive index generated in operation 660, the terminal 200 attempts a wireless channel access.

In the wireless channel access method according to an embodiment of the present invention, by alleviating wireless channel access competition, a wireless connection speed of a terminal may be improved and power consumption of the terminal may be reduced.

In addition, while repeatedly determining a wireless channel accessibility of a terminal, the competitive index received from an access point may be gradually reduced, thereby increasing a possibility of the wireless channel access of the terminal.

Figure 7:
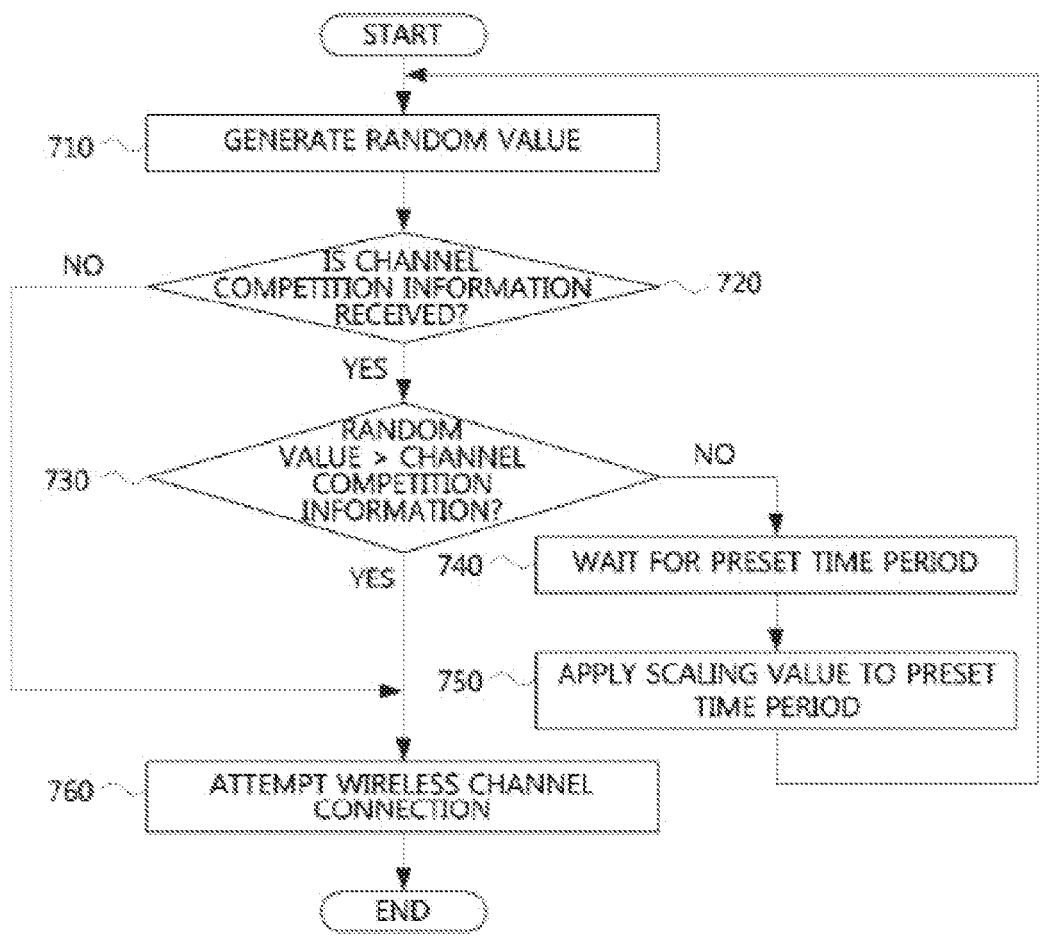
FIG. 7 is a flowchart illustrating a wireless channel access process which is performed in a terminal according to still another embodiment of the present invention.

FIG. 7 is a flowchart illustrating a wireless channel access process which is performed in the terminal 200 according to still another embodiment of the present invention.

Referring to FIG. 7, in operation 710, the terminal 200 generates a random value (r) within a range of [$r_{min}$, $r_{max}$] so as to attempt to connect to the access point 100 before participating in wireless channel access competition.

Next, in operation 720, the terminal 200 determines whether a competitive index Q is received from the access point 100.

In operation 760, when it is determined through operation 720 that the competitive index is not received from the access point 100 for a preset time period, the terminal 200 attempts a wireless channel access.

Alternatively, in operation 730, when it is determined through operation 720 that the competitive index is received from the access point 100, the terminal 200 compares the generated random value (r) and the received competitive index.

In operation 740, when it is determined through operation 730 that the random value is smaller than or equal to the competitive index, the terminal 200 waits for a preset time period.

Next, in operation 750, the terminal 200 generates a shorter waiting time period than the preset time period by applying a scaling value to the preset time period.

The terminal 200 generates the shorter waiting time period than the preset time period in operation 750, and then returns to operation 710 to perform the following operations again.

Next, in operation 740, when it is determined again through operation 730 that the random value is smaller than or equal to the competitive index, the terminal 200 waits for the shorter waiting time period generated in operation 750.

The terminal 200 generates a waiting time period shorter than the generated time period in operation 750, and then returns to operation 710 to perform the following operations again.

Alternatively, in operation 760, when it is determined through operation 730 that the random value exceeds the received competitive index, the terminal 200 attempts a wireless channel access.

In the wireless channel access method according to an embodiment of the present invention, by alleviating wireless channel access competition, a wireless channel access speed of a terminal may be improved and power consumption of the terminal may be reduced.

In addition, while repeatedly determining a wireless channel accessibility of a terminal, the preset time period may be gradually reduced, thereby increasing a possibility of the wireless channel access of the terminal 200.

Figure 8:
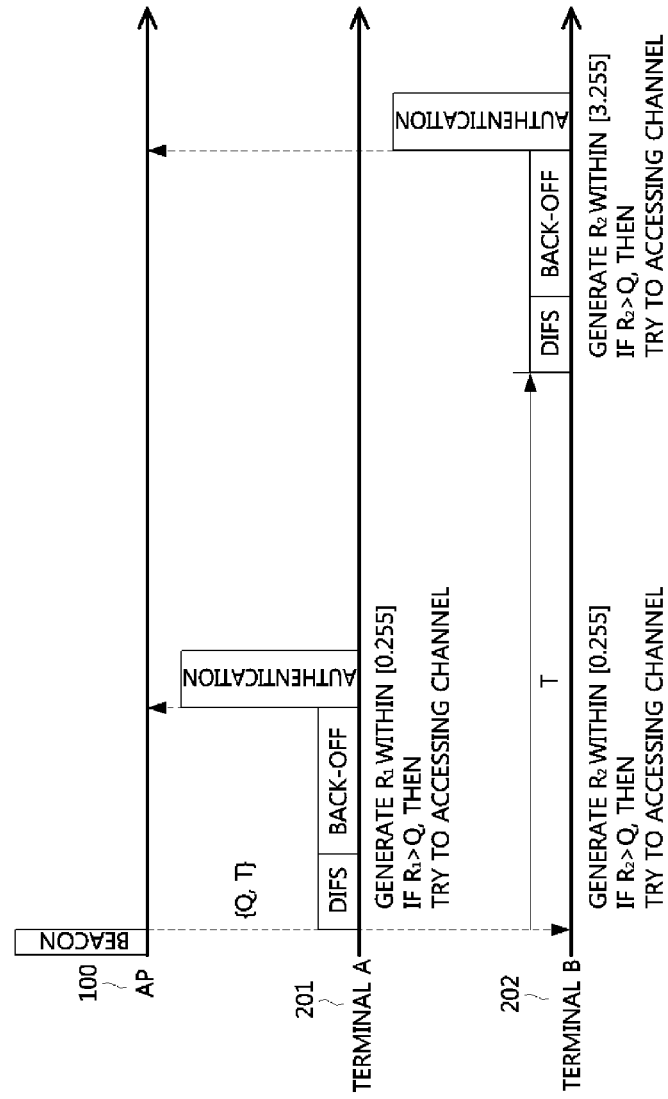
FIG. 8 is a conceptual diagram illustrating a process of requesting a wireless connection to an access point according to an embodiment of the present invention.

FIG. 8 is a conceptual diagram illustrating a process of requesting a wireless channel access according to an embodiment of the present invention.

Referring to FIG. 8, the access point 100 transmits a competitive index to the terminal A (201) and the terminal B (202) through a beacon.

When a generated random value ($r_1$) exceeds the competitive index received from the access point 100 based on a comparison result between the competitive index and the random value ($r_1$), the terminal A (201) waits for a time period corresponding to DIFS and a back-off timer, and then transmits an authentication request message to the access point 100.

In addition, when a generated random value ($r_2$) is smaller than or equal to the received competitive index, the terminal B (202) waits for a preset time period (T), and then transmits the authentication request message to the access point 100 when the random value ($r_2$) exceeds the competitive index.

In the wireless channel access method according to an embodiment of the present invention, by alleviating wireless channel access competition, a wireless connection speed of a terminal may be improved and power consumption of the terminal may be reduced.

Components which will be described below are classified functionally rather than physically, and may be defined by functions performed by each component. Each component may be implemented by hardware and/or a program code and a processing unit which perform each function, and implemented in such a manner that functions of at least two components are included in a single component.

Therefore, in the following embodiments, names given to components are given to imply a representative function performed by each component rather than physical separation, and it should be noted that the technical sprit of the present invention is not limited by the names of components.

Figure 9:
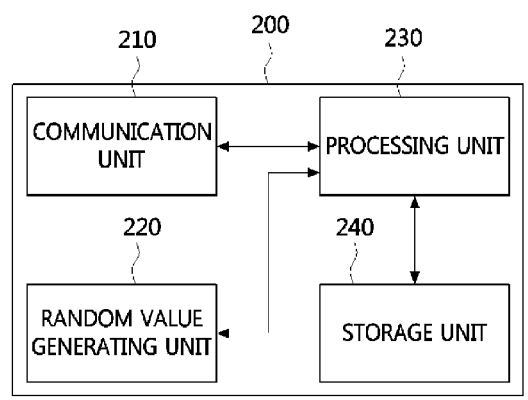
FIG. 9 is a block diagram illustrating a configuration of a terminal that performs a wireless channel access method according to an embodiment of the present invention.

FIG. 9 is a block diagram illustrating a configuration of a terminal that performs a wireless channel access method according to an embodiment of the present invention.

Referring to FIG. 9, the terminal 200 according to an embodiment of the present invention may include a communication unit 210, a random value generating unit 220, a processing unit 230, and a storage unit 240.

First, the communication unit 210 attempts a wireless channel access based on control of the processing unit 230, and transmits and receives data to and from the access point 100.

The random value generating unit 220 generates a random value (r) within a range of [minimum random value ($r_{min}$), maximum random value ($r_{max}$)] before attempting the wireless channel access based on the control of the processing unit 230.

Here, the minimum random value ($r_{min}$) and the maximum random value ($r_{max}$) respectively denote a minimum value and a maximum value which limit a range for generating the random value (r) by the terminal 200, and may be arbitrary values within the range [minimum competitive index ($Q_{min}$), maximum competitive index ($Q_{max}$)] of the competitive index.

In addition, the random value generating unit 220 waits for a preset time period based on the control of the processing unit 230, generates a second random value larger than the random value, and then provides the generated second random value to the processing unit 230.

Here, the random value generating unit 220 may generate the second random value larger than the random value based on Equation 1 which has been described above.

Alternatively, the random value generating unit 220 may generate the second random value larger than the random value by applying a preset scaling value to the random value.

According to another embodiment of the present invention, each function performed by the random value generating unit 220 may be performed by the processing unit 230.

The processing unit 230 compares the random value provided from the random value generating unit 220 and a competitive index received from the access point 100 through the communication unit 210, and determines whether the processing unit 230 attempts to access a wireless channel and transmit a wireless connection request message to the access point 100 again based on the comparison result.

In addition, when the random value provided from the random value generating unit 220 exceeds the competitive index, the processing unit 230 access the wireless channel and transmits the wireless connection request message to the access point 100 through the communication unit 210.

Alternatively, when the random value provided from the random value generating unit 220 is smaller than or equal to the competitive index, the processing unit 230 determines the wireless channel accessibility again.

Specifically, when the random value provided from the random value generating unit 220 is smaller than or equal to the competitive index, the processing unit 230 waits for a preset time period, and controls the random value generating unit 220 so as to generate a second random value larger than the provided random value.

Next, the processing unit 230 receives the second random value from the random value generating unit 220, compares the received second random value and another competitive index received from the access point 100, and determines the wireless channel accessibility again based on the comparison result.

Here, the preset time period may be an arbitrary time period selected by the terminal 200 within an access restriction time range [0, T], and can be used to distribute a point of time of determining a secondary wireless channel accessiblity of terminals with a primary wireless channel access restriction.

Alternatively, when the provided random value is smaller than or equal to the competitive index, the processing unit 230 waits for a preset time period, receives another competitive index from the access point 100, and generates a smaller competitive index than the competitive index by applying a preset scaling value to the other received competitive index.

Next, the processing unit 230 compares the provided random value and the generated smaller competitive index, and determines the wireless channel accessibility again based on the comparison result.

Alternatively, when the provided random value is smaller than or equal to the competitive index, the processing unit 230 waits for a preset time period, and then sets a second preset time period shorter than the preset time period by applying a scaling value to the preset time period.

Next, the processing unit 230 compares the random value and the competitive index received from the access point 100 through the communication unit 210, and determines the wireless channel accessibility again based on the comparison result.

The storage unit 240 may be constituted of a large capacity non-volatile storage device (for example, a hard disk drive), and the random value, the preset time period, and the competitive index may be stored in the storage unit 240.

Here, the random values, the preset time period, and the competitive indexes may be updated based on the control of the processing unit 230 whenever the wireless channel accessibility is determined.

As described above, in the wireless channel access method and apparatus according to the embodiments of the present invention, the random value is generated, the generated random value and the competitive index received from the access point are compared, and the wireless connection request message is transmitted to the access point when the random value is larger than the received competitive index. Alternatively, when the random value is smaller than or equal to the received competitive index, in the wireless channel access method and apparatus, waiting for a preset time period is performed, another random value is generated to be larger than a previous random value to enhance a priority, and the wireless channel accessibility is determined again.

Accordingly, in an environment in which a large number of WLAN terminals simultaneously attempt the wireless channel access, each terminal voluntarily restricts a wireless connection request in accordance with wireless channel environment information transmitted by an access point, that is, competitive indexes, and therefore wireless channel access competition may be alleviated, thereby improving a wireless connection speed of the terminal and reducing power consumption of the terminal.

While the example embodiments of the present invention and their advantages have been described in detail, it should be understood that various changes, substitutions and alterations may be made herein without departing from the scope of the invention.

What is claimed is:

1. A wireless channel access method which is performed in a terminal, comprising:
   generating a random value for a wireless channel access;
   receiving a competitive index indicating a channel competition state from an access point;
   determining whether to attempt the wireless channel access based on a comparison result between the random value and the competitive index; and
   attempting the wireless channel access in response to the random value being greater than the competitive index,
   wherein the competitive index is a channel utilization value of a respective basic service set (BSS) load element, and the channel utilization value is of one byte length indicating a value corresponding to one of 0 to 255 steps.

2. The wireless channel access method of claim 1, wherein the competitive index is a value determined based on at least one of collision rate information, authentication request frequency information, and association request frequency information.

3. The wireless channel access method of claim 1, wherein the attempting the wireless channel access includes transmitting a wireless connection request message to the access point when the random value exceeds the competitive index.

4. The wireless channel access method of claim 1, wherein the attempting the wireless channel access includes waiting for a preset time period when the random value is smaller than or equal to the competitive index.

5. The wireless channel access method of claim 4, further comprising, after the waiting for the preset time period:
   generating a first random value larger than the random value;
   receiving another competitive index different from the competitive index from the access point; and
   determining whether to attempt the wireless channel access based on a comparison result between the first random value and the other competitive index.

6. The wireless channel access method of claim 5, wherein the generating of the first random value includes generating the first random value larger than the random value based on a maximum competitive index and the number of determinations of whether to attempt the wireless channel access.

7. The wireless channel access method of claim 5, wherein the generating of the first random value includes generating the first random value larger than the random value by applying a preset scaling value to the random value.

8. The wireless channel access method of claim 4, further comprising, after the waiting for the preset time period:
   receiving another competitive index different from the competitive index from the access point;
   generating a first competitive index smaller than the competitive index by applying a preset scaling value to the other competitive index; and
   determining whether to attempt the wireless channel access based on a comparison result between the random value and the first competitive index.

9. The wireless channel access method of claim 4, further comprising:
   setting a first time period shorter than the preset time period by applying a scaling value to the preset time period; and
   performing the generating of the random value, the receiving of the competitive index, and the determining of whether to attempt the wireless channel access again.

10. The wireless channel access method of claim 1 further comprising:
    determining a collision occurred during the wireless channel access;
    generating another random value for the wireless channel access; and
    determining whether to attempt another wireless channel access based on another comparison result between said another random value and the competitive index.

11. The wireless channel access method of claim 1, further comprising:
    when the terminal determines to attempt the wireless channel access,
    performing a backoff procedure based on a contention window before transmitting a frame.

12. The wireless channel access method of claim 1, wherein the random value is generated according to the following equation:

$$r(n) = \text{Min}(Q_{max}, 2^{n+1} - 1)$$

where n denotes an n-th attempt for wireless channel access by the terminal, r denotes a random value, and $Q_{max}$ denotes a maximum competitive index.

13. The wireless channel access method of claim 1, wherein the wireless channel access is performed based on said determining whether to attempt the wireless channel access without further information from the access point.

14. A wireless channel access method which is performed in an access point, comprising:
- determining a competitive index indicating a channel competition state at every preset period;
- determining whether wireless connection restriction of a plurality of terminals is required;
- transmitting the determined competitive index to the plurality of terminals when it is determined that the connection restriction is required; and
- receiving an attempt to access a wireless channel in response to a random value, generated by one of the terminals, being greater than the competitive index,
- wherein the competitive index is a channel utilization value of a respective basic service set (BSS) load element, and the channel utilization value is of one byte length indicating a value corresponding to one of 0 to 255 steps.

15. The wireless channel access method of claim 14, wherein the competitive index is a value determined based on at least one of collision rate information, authentication request frequency information, and association request frequency information.

16. A terminal comprising:
- a communication unit;
- a random value generating unit configured to generate and provide a random value for a wireless channel access; and
- a processing unit configured to compare the random value and a competitive index indicating a channel competition state received from an access point and through the communication unit, to determine whether to attempt the wireless channel access based on the comparison result and to attempt the wireless channel access in response to the random value being greater than the competitive index,
- wherein the competitive index is a channel utilization value of a respective service set (BSS) load element, and the channel utilization is of one byte length indicating a value corresponding to one of 0 to 255 steps.

17. The terminal of claim 16, wherein, when the random value exceeds the competitive index, the processing unit transmits a wireless connection request message to the access point through the communication unit.

18. The terminal of claim 16, wherein, when the random value is smaller than or equal to the competitive index, the processing unit waits for a preset time period, and controls the random value generating unit so as to generate a first random value larger than the random value.

19. The terminal of claim 16, wherein, based on the control of the processing unit, the random value generating unit generates a first random value larger than the random value based on a maximum competitive index and the number of determinations of whether to attempt the wireless channel access, and provides the generated first random value to the processing unit.

20. The terminal of claim 19, wherein the processing unit receives another competitive index different from the competitive index from the access point through the communication unit, compares the first random value and the other competitive index, and then determines whether to attempt the wireless channel access again based on the comparison result.

21. A wireless channel access method, comprising:
performing in a terminal:
- generating a random value for a wireless channel access;
- receiving a competitive index indicating a channel competition state from an access point; and
- determining whether to attempt the wireless channel access based on a comparison result between the random value and the competitive index,
- receiving another competitive index different from the competitive index from the access point;
- generating a first competitive index smaller than the competitive index by applying a preset scaling value to the other competitive index;
- determining whether to attempt the wireless channel access based on a comparison result between the random value and the first competitive index; and
- attempting the wireless channel access in response to the random value being greater than any of the competitive index and the first competitive index, wherein
- the competitive index or the first competitive index is a channel utilization value of a basic service set (BSS) load element, and
- the channel utilization value is of one byte length indicating a value corresponding to one of 0 to 255 steps.

* * * * *